(12) United States Patent
Jackson

(10) Patent No.: US 7,946,531 B2
(45) Date of Patent: May 24, 2011

(54) DEBRIS DEFLECTING DEVICE, SYSTEM, AND METHOD

(75) Inventor: Rick A. Jackson, Fountain Valley, CA (US)

(73) Assignee: The Boeing Company, Chicago, IL (US)

(*) Notice: Subject to any disclaimer, the term of this patent is extended or adjusted under 35 U.S.C. 154(b) by 627 days.

(21) Appl. No.: 12/031,466

(22) Filed: Feb. 14, 2008

(65) Prior Publication Data

US 2009/0206199 A1 Aug. 20, 2009

(51) Int. Cl.
*B64C 25/00* (2006.01)
*B64C 7/00* (2006.01)
(52) U.S. Cl. .................... 244/121; 244/100 R
(58) Field of Classification Search ............. 244/100 R, 244/103 R, 1 R, 121, 129.1
See application file for complete search history.

(56) References Cited

U.S. PATENT DOCUMENTS

| 3,088,751 | A | * | 5/1963 | Barry et al. | 280/851 |
| 3,670,996 | A | * | 6/1972 | Jenny | 244/103 R |
| 4,389,029 | A | | 6/1983 | Glasenapp et al. | |
| 4,681,285 | A | | 7/1987 | Bowdy et al. | |
| 5,058,827 | A | * | 10/1991 | Dansereau et al. | 244/103 R |
| 6,845,943 | B2 | | 1/2005 | Chambers et al. | |

\* cited by examiner

*Primary Examiner* — Joshua J Michener
*Assistant Examiner* — Brian M. O'hara

(57) ABSTRACT

A debris deflector includes a bracket and a horizontal blade assembly. The bracket is to secure the debris deflector to an aft side of a landing gear assembly. The horizontal blade assembly is secured to the bracket. The horizontal blade assembly includes a blade and flap. The blade has a forward blade edge, blade body, and trailing blade edge. The forward blade edge is configured for placement aft of a tire for the landing gear assembly. The blade body extends outward from the forward blade edge substantially parallel to a road surface. The flap is secured to the trailing blade edge and extends from the trailing blade edge generally rearward and downward from the trailing edge.

19 Claims, 5 Drawing Sheets

DEBRIS DEFLECTING DEVICE, SYSTEM, AND METHOD

TECHNICAL FIELD

The present disclosure generally relates to a device for deflecting debris. More particularly, the present disclosure pertains to a device and system for deflecting runway debris away from an aircraft.

BACKGROUND

It is generally known that as a tire passes over debris on a road surface, the debris may be carried aloft. This airborne debris has the potential to cause damage. In a well known example, cars and trucks often include mud flaps to mitigate airborne road debris and any subsequent damage to the vehicle and vehicles in the vicinity. While most debris that strikes a mud flap falls down to the road surface, some debris may be redirected back towards the tire. If this moving debris comes in contact with the rotating tire, the debris may be accelerated to an even greater velocity. Rather than being directed towards the mud flap, this fast moving debris may be directed upwards and/or forwards. Most car and trucks include wheel wells that are capable of sustaining impact from such debris.

Modern aircraft generally include delicate instruments that may be placed on the aircraft underside. While mud flaps may reduce the quantity of airborne debris from landing gear, conventional mud flaps may actually cause some debris to be directed towards the aircraft with greater velocity than the debris otherwise would have. In addition, due to size and weight concerns, aircraft generally do not include wheel wells. Therefore, conventional mud flaps are generally not appropriate for use on aircraft.

Accordingly, it is desirable to provide a debris deflecting device and system that is capable of overcoming the disadvantages described herein at least to some extent.

SUMMARY

The foregoing needs are met, to a great extent, by embodiments of the present disclosure, wherein in one respect a debris deflecting device and system is provided that in some embodiments reduces airborne debris from aircraft landing gear.

An embodiment relates to a debris deflector for a tire of a vehicle. The debris deflector includes a bracket and a horizontal blade assembly. The bracket secures the debris deflector to the vehicle. The debris deflector is disposed at an aft side of the tire. The horizontal blade assembly is secured to the bracket. The horizontal blade assembly includes a blade having a forward blade edge, blade body, and trailing blade edge. The forward blade edge is configured for placement aft of the tire and the blade body extends outward from the forward blade edge substantially parallel to a road surface.

Another embodiment pertains to an airplane including a fuselage, nose landing gear, and debris deflector. The nose landing gear is disposed below a forward section of the fuselage and includes a tire to support the airplane on a surface. The debris deflector is disposed behind the tire relative to a forward movement of the airplane. The debris deflector includes a bracket to secure the debris deflector to the nose landing gear and a horizontal blade assembly secured to the bracket.

There has thus been outlined, rather broadly, certain embodiments of the disclosure in order that the detailed description thereof herein may be better understood, and in order that the present contribution to the art may be better appreciated. There are, of course, additional embodiments that will be described below and which will form the subject matter of the claims appended hereto.

In this respect, before explaining at least one embodiment in detail, it is to be understood that the disclosure is not limited in its application to the details of construction and to the arrangements of the components set forth in the following description or illustrated in the drawings. The disclosed device and method is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various embodiments. It is important, therefore, that the claims be regarded as including such equivalent constructions insofar as they do not depart from the spirit and scope of the various embodiments.

DETAILED DESCRIPTION OF THE PREFERRED EMBODIMENT

The present disclosure provides a device and method for deflecting debris cast up off a surface by a tire rolling on the surface. In general, the various embodiments deflect debris downward and away from the underside of an aircraft.

Figure 1:
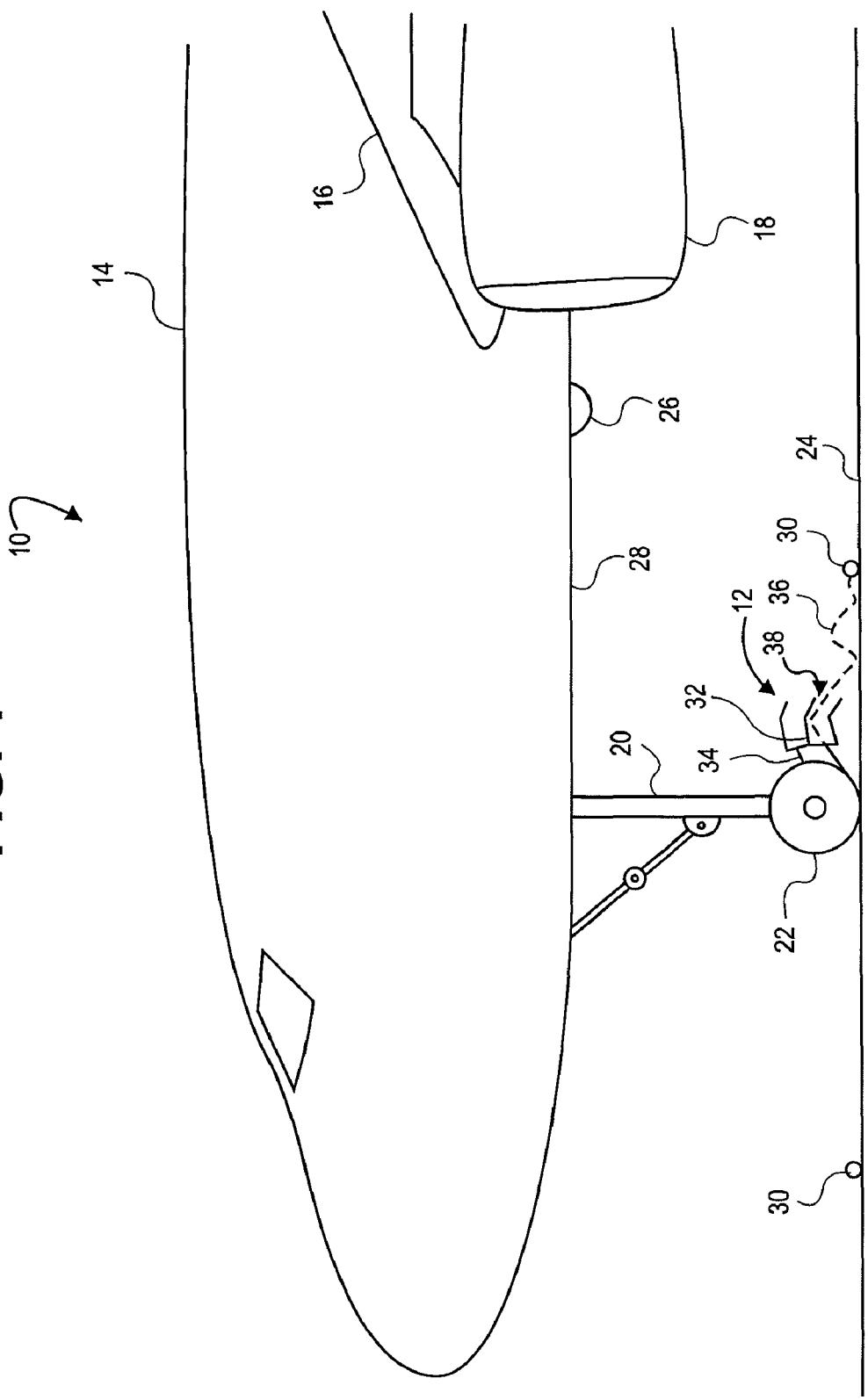
FIG. 1 is a side view of an airplane that includes a debris deflector in accordance with an embodiment.

The invention will now be described with reference to the drawing figures, in which like reference numerals refer to like parts throughout. FIG. 1 is a side view of an airplane 10 that includes a debris deflector 12 in accordance with an embodiment. As shown in FIG. 1, the airplane 10 includes a fuselage 14, wing 16, engine 18 and landing gear 20 that includes a tire 22 for landing/takeoff from a surface 24. Also shown in FIG. 1, the airplane 10 includes an instrument 26 mounted to an underside 28 of the airplane 10.

As the airplane 10 moves forward, the wheel 22 rolls over the surface 24, any foreign object debris ("FOD") 30 that the wheel rolls over may, temporarily adhere to the wheel 22 and may be cast upward and towards the underside 28. The faster the plane is moving, the greater the relative velocity of the FOD 30 compared to the airplane 10. As such, during take-off and landing procedures, the FOD 30 may be propelled towards the underside 28 at a high relative velocity.

While modern, well maintained, runways generally include little or no FOD 30 on the runway, airplanes are sometimes required to land on semi-prepared runways. For example, war zone operations, humanitarian missions, landing in undeveloped areas, and the like may necessitate landing on and taking off from semi-prepared runways.

To reduce the likelihood of the FOD 30 contacting the instrument 26, the debris deflector 12 includes one or more horizontally mounted blades 32. These blades 32 may include any suitable material. Examples of suitable materials include metal, composites, plastics, and the like. Examples of suitable metals include pure and alloyed aluminum, magnesium, titanium, steel, etc. Examples of suitable composites include fiber and metal foil reinforced plastics, such as fiberglass, carbon fiber, titanium graphite, etc. Examples of plastics or polymers include polycarbonate (Lexan®), etc.

In the particular example shown, three blades 32 are mounted to the landing gear 20 via a mounting bracket 34. However, in other examples, the debris deflector 12 may include one, two, four, or more blades. The blade or blades 32 is configured to deflect the FOD 30 downward. A particular path or trajectory 36 is shown by example in FIG. 1. As shown, the FOD 30 is ejected upwards and continues upward until it strikes the blade 32 and is deflected downward and away from the underside 28. To facilitate the FOD 30 passing through the debris deflector 12 without being deflected back towards the wheel 22, the blades 32 are separated by a gap 38. It is an advantage of this and other embodiments that the horizontally mounted blade 32 reduces the likelihood that the FOD 30 will be deflected back towards the wheel 22. It is a further advantage that the gap 38 allows the FOD 30 to pass through the debris deflector 12.

In addition, although the debris deflector 12 is shown mounted to a forward landing gear or nose landing gear 20, mounting of the debris deflector 12 is not limited to nose landing gear but rather may be mounted to any suitable landing gear. Furthermore, although the debris deflector 12 is particularly suitable for use in aircraft landing gear, the debris deflector 12 may be utilized in any suitable vehicle. Examples of suitable vehicles include planes, trucks, buses, cars, motorcycles, and the like. In a particular example, the debris deflector 12 may be mounted aft of the rearmost set of tires on a truck or bus. By disposing the debris deflector 12 aft of the rearmost tires, any road debris directed upwards by the tires may be redirected back down to the road surface. In this manner, airborne debris may be directed away from trailing vehicles.

Figure 2:
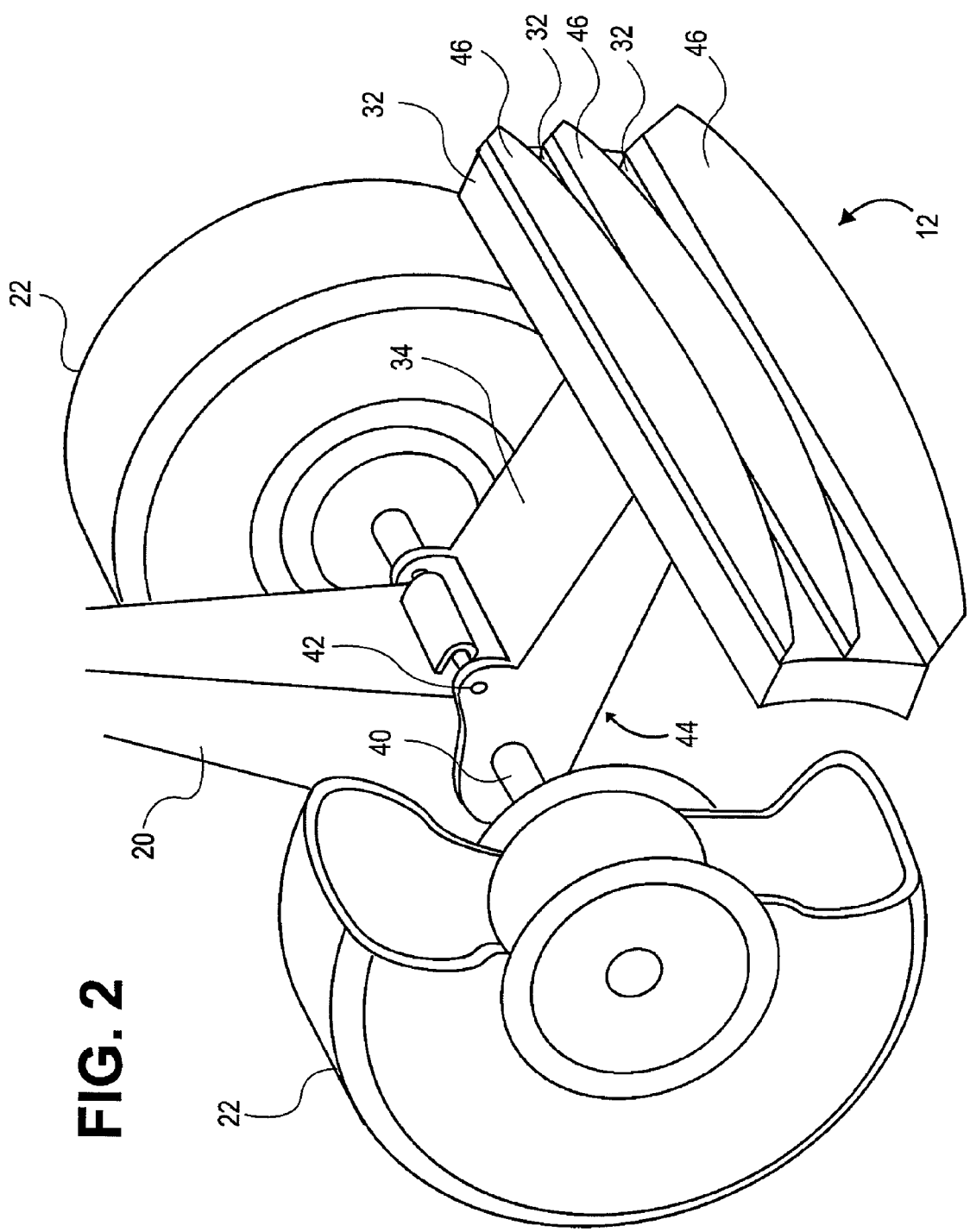
FIG. 2 is a partial cutaway view of the debris deflector in accordance with FIG. 1.

FIG. 2 is a partial cutaway view of the debris deflector 12 in accordance with FIG. 1. As shown in FIG. 2, the mounting bracket 34 is secured to the landing gear 20. In a particular example, landing gear 20 includes a pair of tires 22 secured to the landing gear 20 via a shaft 40 and the mounting bracket 34 is secured to the landing gear 20 between the pair of tires 22. More particularly, the mounting bracket 34 may be detachable secured to the landing gear 20 via the shaft 40 passing through a portion of the bracket 34. In other examples, the mounting bracket 34 may include a plurality of components that are bolted, riveted, or otherwise affixed about the shaft 40 to capture the shaft 40. In addition, the debris deflector 12 may include a fastener 42 to further facilitate fastening the debris deflector 12 to the landing gear 20. In a particular example, the fastener 42 may secure the debris deflector 12 at a particular angle relative to the landing gear 20. In various examples, the fastener 42 may include, pins, screws, bolts, and the like. It is an advantage of various embodiments that configuring the mounting bracket 34 to capture the shaft 40 and the fastener 42 facilitate retroactively attaching the debris deflector 12 to an existing landing gear.

According to an embodiment, the bracket 34 includes a horizontal bottom plate 44. This horizontal bottom plate 44 is configured to deflect debris that might otherwise pass upward between the tires 22. Also shown in FIG. 2, the debris deflector 12 includes flaps 46 secured to the blades 32. In general, the flaps 46 act to extend the fore to aft length of the blades 32. The flaps 46 may include a resilient/deformable panel configured to absorb energy of the FOD 30 striking the flaps 46 and, thereby, slow the velocity of the FOD 30.

It is to be noted that while the mounting bracket 34 is shown mounted to the landing gear 20 via the fastener 42 and via capture of the shaft 40, embodiments are not limited to this particular manner of attachment. Instead, any suitable method of attachment may be employed. For example, the landing gear 20 may include a set of mounting lugs suitable for attaching the mounting bracket 34 via corresponding bolts.

Figure 3:
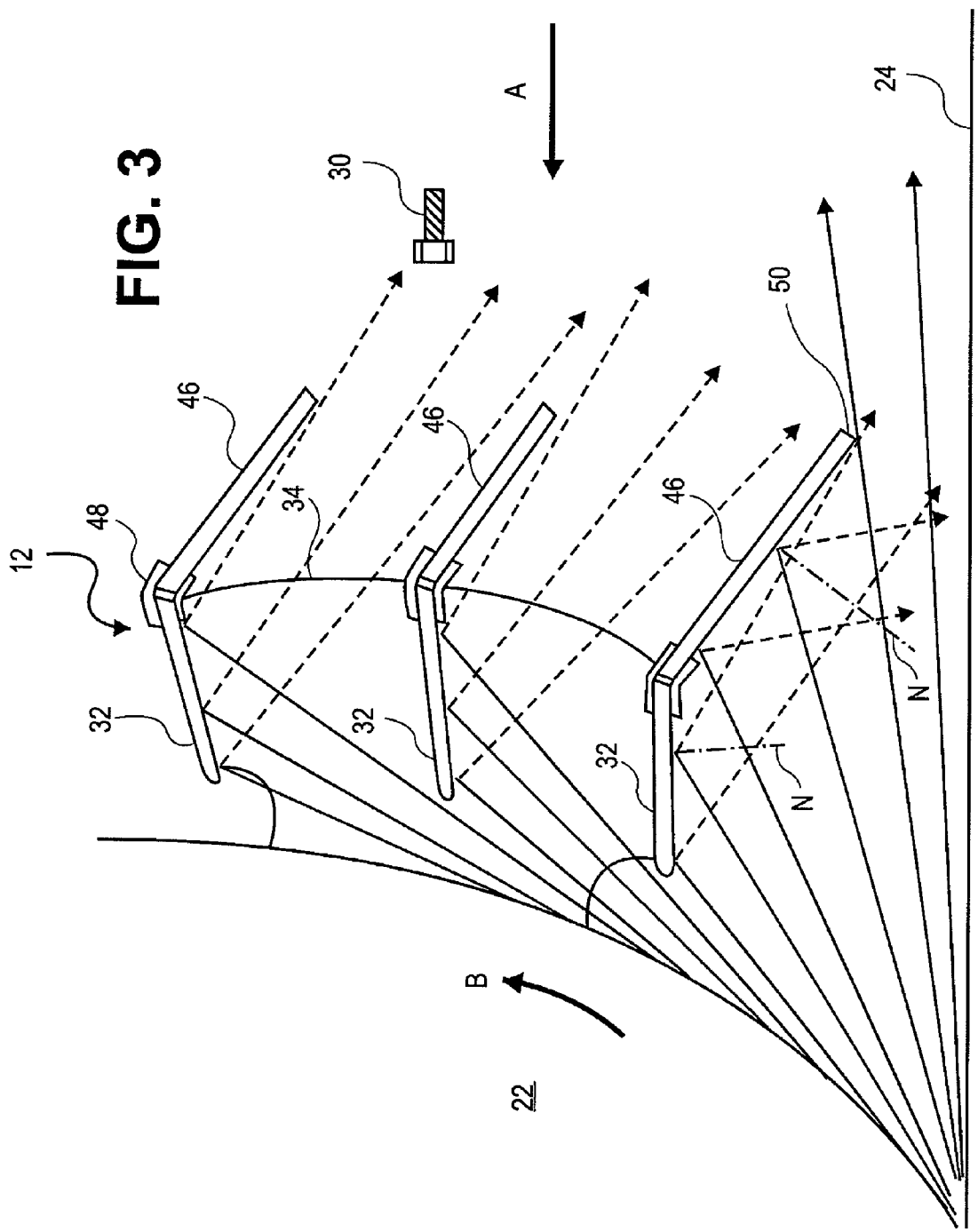
FIG. 3 is a view of trajectories for debris deflected by the debris deflector in accordance with FIG. 1.

FIG. 3 is a view of trajectories for FOD 30 deflected by the debris deflector 12 in accordance with FIG. 1. As shown in FIG. 3, as the airplane moves in direction "A" the tire 22 rotates in direction "B." As the tire 22 passes over the FOD 30, the FOD 30 may adhere to the tire 22 for a random length of time. As the FOD 30 detaches from the tire 22, the FOD 30 may be cast upwards at an angle that is generally tangent to the tire 22 at the point of detachment. Upon striking the blade 32 and/or flap 46, the FOD 30 is deflected at an angle that is equal and opposite to a line "N" normal to (e.g., perpendicular to) the blade 32 and/or flap 46. In this manner, the FOD 30 ejected up towards the underside 28 (shown in FIG. 1) is deflected downward to the surface 24 or otherwise directed away from the underside 28.

Also shown in FIG. 3, the debris deflector 12 may include a coupling 48 to join the blade 32 to the flap 46. In a particular example, the coupling 48 facilitates joining the flap 46 at an angle relative to the blade 32. In this manner, the flap 46 may be angled downward to facilitate deflecting the FOD 30 towards the surface 24. However, in other embodiments the flap 46 may be directly affixed to the blade 32. It is advantage of the downwardly sloping flap 46 that a trailing edge 50 of the flap 46 may be disposed in closer proximity to the surface 24 than the blade 32. In this regard, the blade 32 is securely affixed to the landing gear 20. As such, the blade 32 is disposed at a sufficient height above the surface 24 to avoid impacting irregularities in the surface 24 or relatively large debris on the surface 24. However, the trailing edge 50 may contact the surface 24 and/or debris without negative consequences due to the flexible properties of the flap 46.

Figure 4:
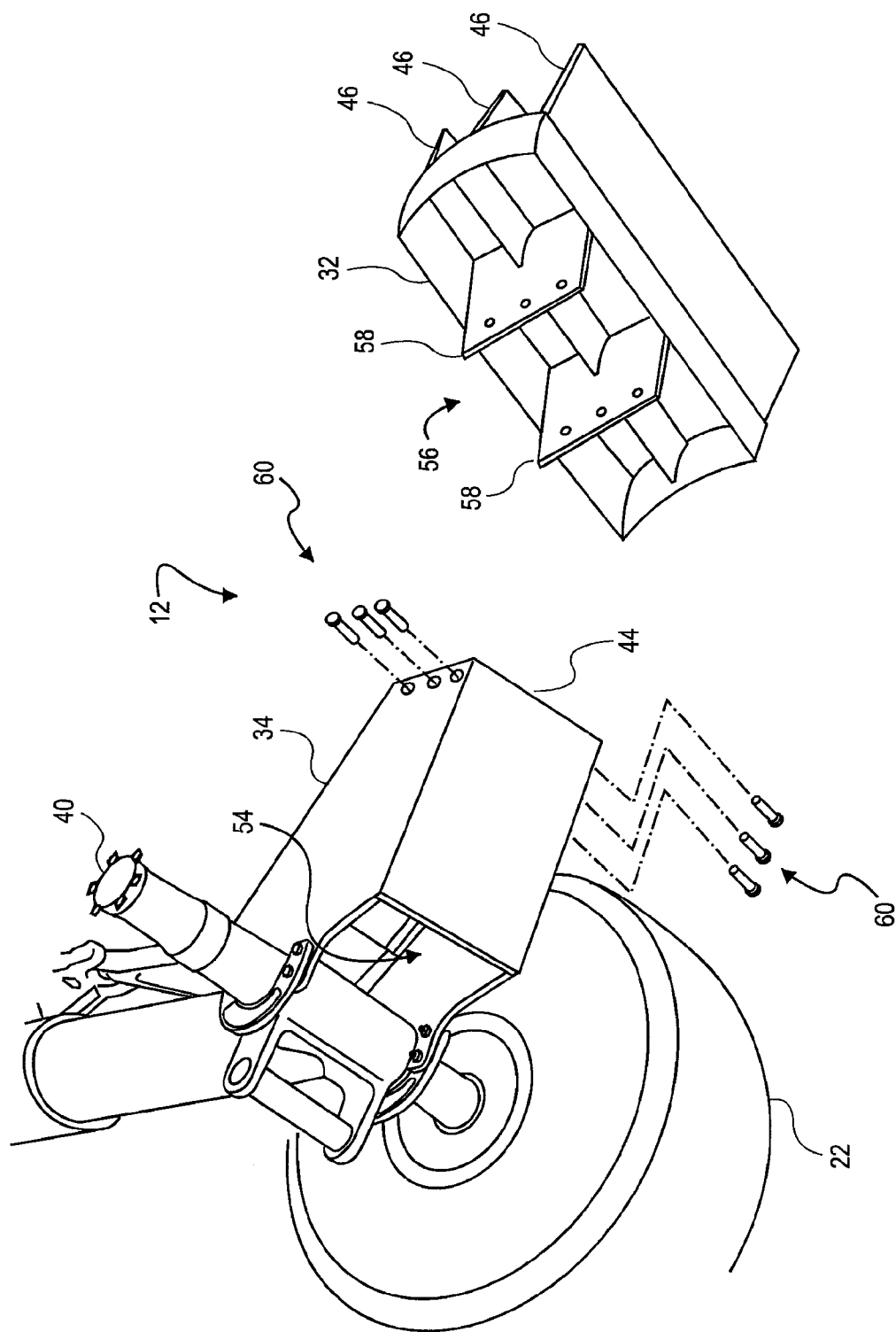
FIG. 4 is a partially exploded view of the debris deflector in accordance with FIG. 1.

FIG. 4 is a partially exploded view of the debris deflector 12 in accordance with FIG. 1. As shown in FIG. 4, the horizontal bottom plate 44 provides a horizontal surface or barrier to prevent debris from being ejected up between the tires 22 (near tire 22 removed for clarity). In addition, the mounting bracket 34 may include an opening 54 to facilitate the passage of air therethrough. In this manner, resistance due to wind may be reduced.

Also shown in FIG. 4, the debris deflector 12 may include a blade assembly 56 that may be detachably secured to the mounting bracket 34. In a particular example, the blade assembly 56 may include a pair of vertical members 58 configured to mate with vertical portions of the mounting bracket 58. Specifically, a set of fasteners 60 maybe utilized to attach the blade assembly 56 to the mounting bracket 34. The set of fasteners 60 include any suitable fastener such as, for example screws, bolts, rivets, etc. It is an advantage of various embodiments that the blade assembly 56 may be quickly and easily replaced or removed by virtue of the set of fasteners 60.

Figure 5:
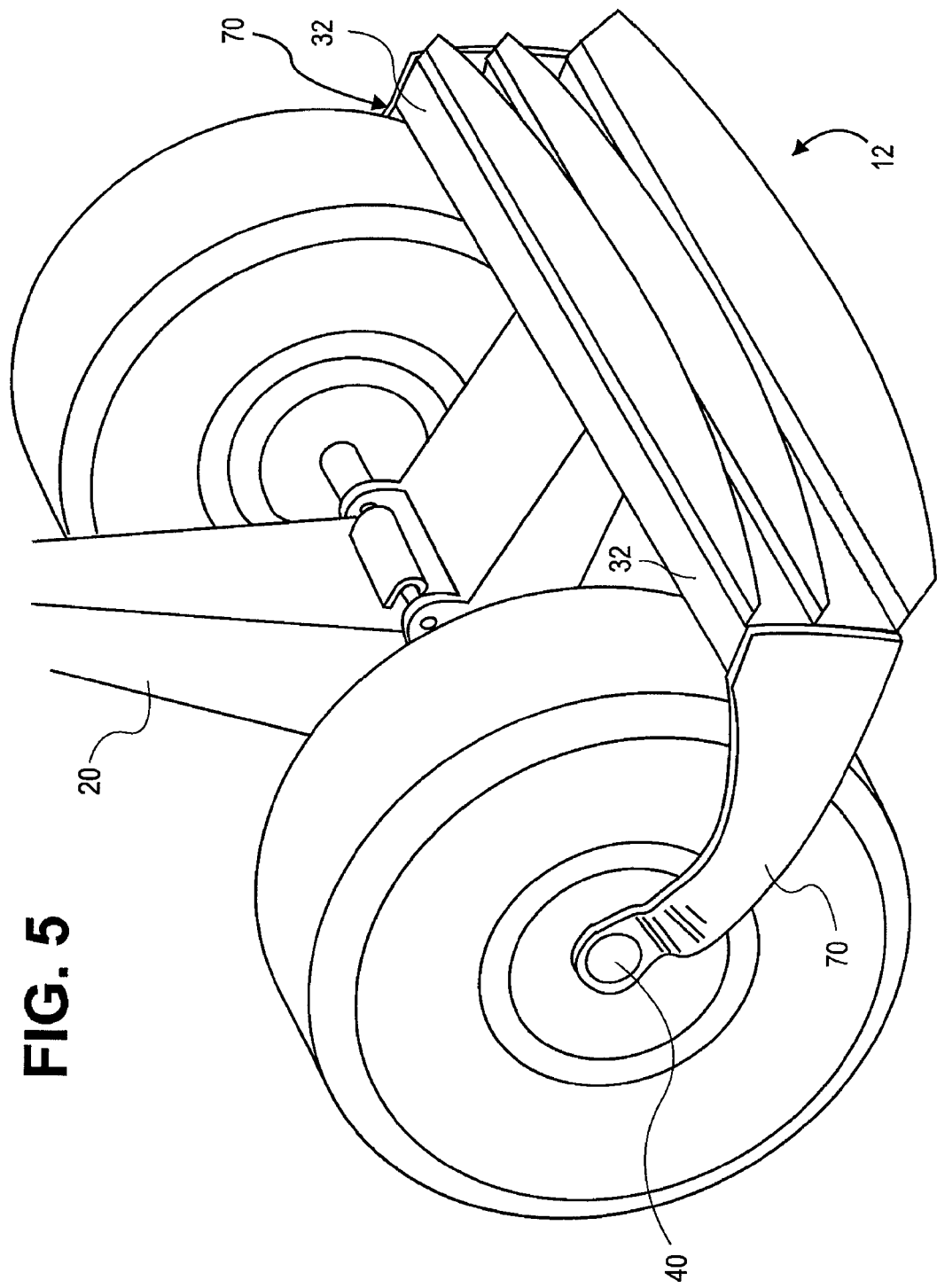
FIG. 5 is a perspective view of the debris deflector in accordance with another embodiment of FIG. 1.

FIG. 5 is a perspective view of the debris deflector 12 in accordance with another embodiment of FIG. 1. The debris deflector of FIG. 4 is similar to the debris deflector of FIG. 2 and thus, for the sake of brevity, those items described with regard to FIG. 2 will not be described again with respect to FIG. 5. As shown in FIG. 5, the debris deflector 12 includes a side mounting bracket 70 to secure one or both sides of the blades 32 to the landing gear 20. In a particular example, the side mounting bracket 70 is secured to the shaft 40.

The many features and advantages of the various embodiments are apparent from the detailed specification, and thus, it is intended by the appended claims to cover all such features and advantages that fall within the true spirit and scope of the embodiments. Further, since numerous modifications and variations will readily occur to those skilled in the art, it is not desired to limit the embodiments to the exact construction and operation illustrated and described, and accordingly, all suitable modifications and equivalents maybe resorted to, falling within the scope of the various embodiments.

What is claimed is:

1. A debris deflector for a tire of an aircraft landing gear, the debris deflector comprising:
   a bracket mounted to the aircraft landing gear and extending aft of the tire; and
   a horizontal blade assembly secured to the bracket, the horizontal blade assembly comprising:
      a blade having a forward blade edge, a blade body, and a trailing blade edge, the forward blade edge being configured for placement aft of the tire, the blade body extending outward from the forward blade edge substantially parallel to a road surface; and
      a flap comprising a resiliently deformable panel being a separate component from the blade and having a first edge coupled to the trailing blade edge and extending unsupported rearwardly and downwardly from the trailing blade edge.

2. The debris deflector according to claim 1, wherein the bracket further includes a horizontal bottom plate.

3. The debris deflector according to claim 1, wherein the blade includes one or more of a composite material, metal, and plastic.

4. The debris deflector according to claim 1, wherein the horizontal blade assembly further comprises:
   a plurality of the blades, arranged vertically and separated by a gap, each blade of the plurality of blades including a respective leading edge disposed proximal to the tire and a respective trailing edge disposed distal to the tire; and
   a plurality of the flaps, each flap of the plurality of flaps including a respective first edge secured to the respective trailing edge of an associated blade, each flap including the elastomeric panel angled downward from the respective first edge.

5. The debris deflector according to claim 4, wherein each respective leading edge of the plurality of blades is disposed equidistant from an outer circumference of the tire.

6. The debris deflector according to claim 1, wherein the vehicle is an aircraft and the debris deflector is disposed aft of a nose landing gear.

7. The debris deflector according the claim 6, wherein the nose landing gear includes a pair of tires and the bracket is secured to the nose landing gear between the pair of tires.

8. The debris deflector according to claim 7, wherein the horizontal blade assembly extends a portion of a distance from an outside edge of a first tire of the pair of tires to an outside edge of a second tire of the pair of tires.

9. The debris deflector according to claim 7, wherein the horizontal blade assembly extends completely across a distance from an outside edge of a first tire of the pair of tires to an outside edge of a second tire of the pair of tires.

10. The debris deflector according to claim 6, further comprising:
    a connector to detachably secure the bracket to an axle of the nose landing gear.

11. An airplane comprising:
    a fuselage;
    a nose landing gear disposed below a forward section of the fuselage, the nose landing gear including a tire to support the airplane on a surface; and
    a debris deflector disposed behind the tire relative to a forward movement of the airplane, the debris deflector comprising:
       a bracket mounted to the nose landing gear; and
       a horizontal blade assembly secured to the bracket and including:
          a blade having a leading edge disposed proximal to the tire and a trailing edge disposed distal to the tire; and
          a flap comprising a resiliently deformable panel being a separate component from the blade and having a first edge coupled to the trailing blade edge and extending unsupported rearwardly therefrom;
          the flap being angled downward from the first edge.

12. The airplane according to claim 11, wherein the bracket further includes a horizontal bottom plate.

13. The airplane according to claim 11, wherein the blade includes one or more of a composite material, metal, and plastic.

14. The airplane according to claim 11, wherein the horizontal blade assembly further comprises:
    a plurality of the blades, arranged vertically and separated by a gap, each blade of the plurality of blades including a respective leading edge disposed proximal to the tire and a respective trailing edge disposed distal to the tire; and
    a plurality of the flaps, each flap of the plurality of flaps including a respective first edge secured to the respective trailing edge of an associated blade, each flap including the resiliently deformable panel being angled downward from the respective first edge.

15. The airplane according to claim 14, wherein each respective leading edge of the plurality of blades is disposed equidistant from an outer circumference of the tire.

16. The airplane according to claim 11, wherein the nose landing gear includes a pair of tires and the bracket is secured to the nose landing gear between the pair of tires.

17. The airplane according to claim 16, wherein the horizontal blade assembly extends a portion of a distance from an outside edge of a first tire of the pair of tires to an outside edge of a second tire of the pair of tires.

18. The airplane according to claim 16, wherein the horizontal blade assembly extends completely across a distance from an outside edge of a first tire of the pair of tires to an outside edge of a second tire of the pair of tires.

19. The airplane according to claim 11 further comprising:
    a connector to detachably secure the bracket to an axle of the nose landing gear.

* * * * *